(12) United States Patent
Swanson et al.

(10) Patent No.: US 8,208,000 B1
(45) Date of Patent: Jun. 26, 2012

(54) METHODS, SYSTEMS AND PROGRAM PRODUCTS FOR MANAGING VIDEO CONFERENCES

(75) Inventors: Jon N. Swanson, Queensbury, NY (US); Jonathan Arnold, Medford, MA (US)

(73) Assignee: Insors Integrated Communications, Chicago, IL (US)

( * ) Notice: Subject to any disclaimer, the term of this patent is extended or adjusted under 35 U.S.C. 154(b) by 918 days.

(21) Appl. No.: 12/207,277

(22) Filed: Sep. 9, 2008

(51) Int. Cl.
*H04N 7/14* (2006.01)
(52) U.S. Cl. .................... 348/14.08; 348/14.01
(58) Field of Classification Search ........... 348/14.01, 348/14.08–14.1, 14.11, 14.12; 709/204; 370/259, 260, 261, 262
See application file for complete search history.

(56) References Cited

U.S. PATENT DOCUMENTS

| | | | |
|---|---|---|---|
| 4,635,251 A | 1/1987 | Stanley et al. | |
| 4,796,293 A | 1/1989 | Blinken et al. | |
| 5,422,883 A | 6/1995 | Hauris et al. | |
| 5,508,732 A | 4/1996 | Bottomley et al. | |
| 5,680,392 A | 10/1997 | Semaan | |
| 5,758,079 A | 5/1998 | Ludwig et al. | |
| 5,991,385 A | 11/1999 | Dunn et al. | |
| 6,282,206 B1 | 8/2001 | Hindus et al. | |
| 6,336,133 B1 * | 1/2002 | Morris et al. | 709/204 |
| 6,363,352 B1 | 3/2002 | Dailey et al. | |
| 6,418,214 B1 | 7/2002 | Smythe et al. | |
| 6,442,758 B1 | 8/2002 | Jang et al. | |
| 6,526,281 B1 | 2/2003 | Gorsuch et al. | |
| 6,584,493 B1 | 6/2003 | Butler | |
| 6,636,888 B1 | 10/2003 | Bookspan et al. | |
| 6,775,247 B1 | 8/2004 | Shaffer et al. | |
| 7,035,230 B1 | 4/2006 | Shaffer et al. | |
| 7,149,288 B2 | 12/2006 | Digate et al. | |
| 7,167,552 B1 | 1/2007 | Shaffer et al. | |
| 7,353,252 B1 | 4/2008 | Yang et al. | |
| 7,571,210 B2 | 8/2009 | Swanson et al. | |
| 2001/0043571 A1 | 11/2001 | Jang et al. | |
| 2002/0133473 A1 | 9/2002 | Grande et al. | |
| 2003/0012149 A1 * | 1/2003 | Maggenti et al. | 370/260 |
| 2003/0105820 A1 | 6/2003 | Haims et al. | |
| 2004/0111472 A1 | 6/2004 | Swanson et al. | |
| 2004/0117446 A1 | 6/2004 | Swanson | |
| 2005/0058088 A1 | 3/2005 | Decker et al. | |

(Continued)

OTHER PUBLICATIONS

Jennifer Teig von Hoffman, "How to Start up an Access Grid Node Using Virtual Venues", (2001), p. 1-9.

(Continued)

*Primary Examiner* — Tuan Nguyen
(74) *Attorney, Agent, or Firm* — Greer, Burns & Crain, Ltd.

(57) ABSTRACT

A computer program product for managing communications during a videoconference includes computer executable instructions stored on a computer readable storage medium that when executed by one or more computers causes the one or more computers to receive an input first set of communications control parameters that apply to all videoconferences to be conducted over one or more videoconference servers. The computer stores the input first set of control parameters in a memory, and receives an input second set of communications control parameters that includes a subset of the first set and that applies to only a portion of videoconferences to be conducted over the one or more videoconference servers. The computer compares the second set of communications control parameters to the first set of control parameters and retains the second set of communications control parameters in a memory for use during the conference if they do not violate the first set of control parameters.

20 Claims, 8 Drawing Sheets

U.S. PATENT DOCUMENTS

2008/0069011 A1\* 3/2008 Sekaran et al. .............. 370/260

OTHER PUBLICATIONS

Access Grid, "The Access Grid Project", www.accessgrid.org (believed published circa 2001).

Jennifer Teig von Hoffman, "Beginner's Guide to Facilitating Interactive Communications on the Access Grid," (2002), p. 1-18.

Ian Foster et al. "A Distributed Resource Management Architecture that Supports Advance Reservations and Co-Allocation," published on the World Wide Web at http://www.globus.org/alliance/publications/papers/iwqos.pdf#search=%22a%20distributed%20resource%20management%20architecture%22 (1999).

Warren Smith, Ian Foster, Valerie Taylor, "Scheduling with Advanced Reservations," International Parallel and Distributed Processing Symposium (IPDPS '00), (2000).

\* cited by examiner

LEVEL 3: CONFERENCE COMMUNICATIONS PARAMATERS

CONFERENCE ID: 13455
ATTENDEES: USERS 3, 4, 7, 44, 46, 48, 52, 55, 65, 69
MODERATOR: USER 44
TIME: 8/27/08; 13:50 – 14:50
PASSWORD: P@SSWORD!

VIDEO:
MAX VIDEO STREAMS PER USER:
 UPSTREAM: 2
 DOWNSTREAM: 2
ALLOWED VIDEO CODEC:
 CODECS 1-3

AUDIO:
MAX AUDIO STREAMS PER USER:
 UPSTREAM: 1
 DOWNSTREAM: 10
ALLOWED AUDIO CODEC:
 CODECS 8-9
AUDIO PRIORITY: 10

VIDEO CONFERENCE:
MAX CONFERENCE LENGTH: 1 HRS
MAX ATTENDEES: 5
TOTAL MAX VIDEO STREAMS: 8

TOOLS:
- WHITEBOARD
TOOLS PRIORITY: 2

BANNED USERS:
- USER 5, 6, 54

FIG. 9

METHODS, SYSTEMS AND PROGRAM PRODUCTS FOR MANAGING VIDEO CONFERENCES

FIELD

The invention relates to managing video conferences. Additional fields include methods, systems and program products for managing communication of data during a collaboration event such as a video conference.

BACKGROUND

Collaboration events such as video conferences can occur over a data network (such as, for example, the Internet, wide area networks or local area networks). During some such events, multiple users may be sharing video, audio and other data with multiple other users. Depending on the scale of the event, very large amounts of data may be shared. This can strain network and participant resources. Also, the large number of streams being communicated can complicate the event and make it difficult for users to effectively communicate with one another.

SUMMARY

One example embodiment is a computer program product for managing communications during a videoconference includes computer executable instructions stored on a computer readable storage medium that when executed by one or more computers causes the one or more computers to receive an input first set of communications control parameters that apply to all videoconferences to be conducted over one or more videoconference servers. The computer stores the input first set of control parameters in a memory, and receives an input second set of communications control parameters that includes a subset of the first set and that applies to only a portion of videoconferences to be conducted over the one or more videoconference servers. The computer compares the second set of communications control parameters to the first set of control parameters and retains the second set of communications control parameters in a memory only if they do not violate the first set of control parameters.

An additional example embodiment of the invention is a video conference system in which multiple users communicate video and audio data to one another over a data network. The system comprises at least one conference server linking the plurality of users over a data network whereby the plurality of users can communicate at least one video data stream and at least one audio data stream to others of the users. A hierarchical arrangement of communications control parameters is provided that control communications between the users over the at least one conference server. The hierarchical control parameters comprise a first level of communications control parameters that apply to all audio and video communications occurring over the conference server between the users and a second level of communications control parameters that includes a subset of the first level parameters that cannot violate the first level parameters. The second level of parameters applies only to a selected portion of video and audio communications occurring over the server group between the users. At least one of the first and second levels of control parameters includes a bandwidth limit and a number of video data streams limit.

Other examples of the invention are described below.

BRIEF DESCRIPTION OF THE DRAWINGS

FIG. 9 illustrates a fourth example set of communications control parameters;

DETAILED DESCRIPTION OF EMBODIMENTS

Before discussing particular features of example embodiments in detail, it will be appreciated that the present invention may be embodied in a method, system, and/or computer program product. For example, a method according to one embodiment may be carried out by one or more users using computers or by one or more computers executing steps of the invention, and a program product of the system may include computer executable instructions that when executed by one or more computers cause one or more computers to carry out steps of a method of the invention. The program instructions of embodiments of the invention may be stored on one or more computer readable media (such as a memory), and may cause results of computations to be stored in one or more memories and/or to be displayed on displays.

Further, one or more computer(s) in combination with connected hardware such as one or more of cameras, microphones, monitors, projectors, and the like that are carrying out steps of a method of the invention and/or that are running a program product of the invention may embody a system of the invention. It will therefore be understood that in describing a particular embodiment of the present invention, be it a method, system or program product, descriptions of other embodiments may also be made. For example, it will be understood that when describing a method of the invention, a system and/or a program product of the system may likewise be described, and vice-versa.

Figure 1:
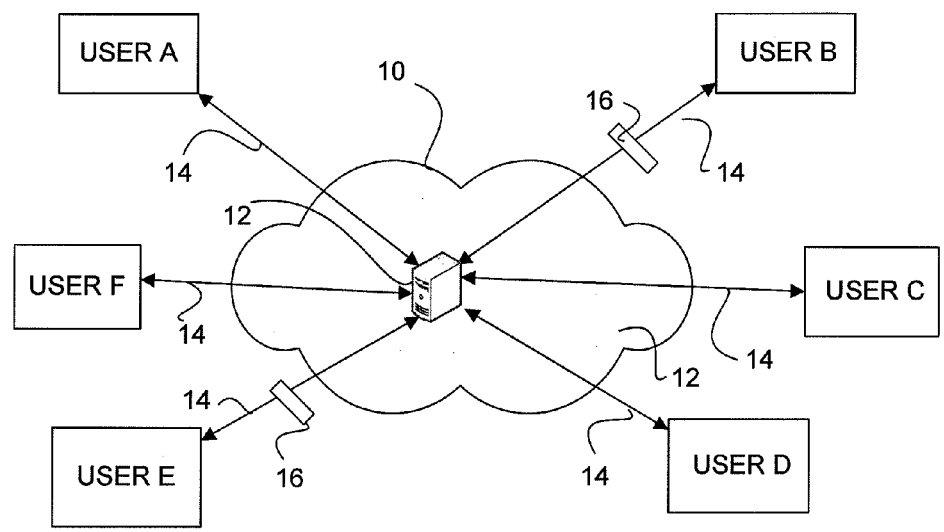
FIG. 1 is a schematic of a network useful to illustrate practice of some embodiments.

Turning now to the drawings, FIG. 1 is a schematic of a network 10 that is useful to describe example methods, program products and systems of the invention. The network shown as cloud 10 includes one or more computers 12 that link Users A-F to one another. The term computer as used herein is intended to be broadly interpreted as at least one electronic device that accepts, processes, stores, and outputs data according to programmed instructions. Thus, a computer can include, by way of example and not by way of limitation, a laptop computer, mainframe computer, cell phone, personal digital assistant, and processor-based controller on a machine. The computer 12 may also comprise one or more components for linking communications between users. It may include, for example, one or more processor based devices linked to one another for communications and each having a plurality of communication ports, a software component running on one or more memories that facilitate communications, a networking card(s), a modem(s), and the like.

The computer 12 can be referred to in the video/audio conferencing and networking arts as a conference server, "bridge" (or as containing a bridge), or the like which can be, for example, a software component running on a server or router that controls one or more ports for interconnecting the Users A-F. As used herein the term port is intended to be broadly interpreted as a physical or logical destination and/or origination point for digital communications. Examples of ports include but are not limited to, network cards, an IP address, a TCP or UDP port number, and the like. A bridge may also comprise software useful to, for example, specifies one or more ports for communication between those users. Further, although only one computer 12 has been shown, others may be provided. A plurality of computers 12 can be referred to collectively as a conference server group.

The network 10 may be a digital or analog communications network, with a packet switched protocol network being one example. A particular example includes a plurality of computers electronically linked to one another and communicating data to one another in internet protocol (IP) format. The network 10 may be a physically wired network, may be a wireless network, or may be some combination of wired and wireless. The network 10 may the Internet, a private network, a public network, a virtual private network, Local Area Network, Wide Area Network, or, of course, a successor to the current Internet (such as, for example, the Fast Internet, or Grid, currently under development by the European Centre for Nuclear Research (CERN) based in Geneva, Switzerland). The CERN Fast Internet is expected by some to transmit data orders of magnitude faster than what is currently understood to be broadband speed. The Fast Internet and each other successors to the Internet are referred to herein simply as fast versions of the Internet.

The protocol between the computer 12 and the Users A-F may be that of a server and client. The server client relationship between the computer 12 and the Users A-F may be reversed on occasion, wherein for some tasks the computer 12 is the client and the User A-F the server, and vice-versa for other tasks.

The network 10 may be useful for a number of data communication purposes. In an example application, the network 10 is useful to facilitate a real-time communications session, such as a video or audio conference, between one or more of the Users A-F. Examples of a video communications session include a videoconference wherein two or more of the Users A-F share streaming video and/or audio communications in real-time with one another.

As used herein the term "real-time" is intended to broadly refer to a condition of generally corresponding to actual time. For example, data can be real-time if it takes about one minute of data playback to describe an event that took about one minute to occur. Real-time data may be, but is not necessarily, "live" data that is generated and communicated substantially contemporaneously with minimal delay or such that the delay is not obtrusive with respect to a particular application. As an example, delay of less than several seconds, or less than 1.0 or 0.25 second, or another, similar time between an event and a communications of such event to another computer user may be considered live for the purposes of the present system.

In a videoconference, for example, multiple participants may be sending and receiving live real-time video and audio data to one another—each is talking to one or more of the others in real-time with delay at a suitably minimal level so that "conversations" between users over the network can take place in real-time. It will therefore be appreciated that the terms, "live" or "real-time" when used in this context is not limited to zero delay, but instead that some minimal delay is allowed for which may be for example of the order of several seconds. The delay should not be so great as to cause difficulties in different users communicating with one another—delays greater than about 5 seconds may be unsuitable in many applications.

In many videoconference or other real-time collaboration events, all of Users A-F may see and hear all others of Users A-F by simultaneously communicating streaming audio and video data streams to all others of the Users A-F. Communications between each of the Users A-F may be carried out on a two-way basis from the network 10, with data sent to and received from each of the Users A-F over the communications lines 14. These may comprise physically wired connections such as copper wires, optical fiber cables, or the like; or may be wireless connections. Real-time video, audio, and other data may be communicated from each of the Users A-F to all others of the Users A-F through the server 12 and over the communications lines 14. A firewall 16 or other security device may isolate the Users A-F from the network 10. The firewall 16 has been illustrated in FIG. 1 as located on the communications link 14. This has been done for illustration only—the firewall 16 may be at any desired location useful to monitor and control access of traffic between a User A-F and the network 10.

Those knowledgeable in the art will appreciate that communications over the network 10 between the Users A-F may be carried out in any of a number of generally known procedures. For example, known methods of one or more of uni-, multi-, or broadcast may be used. Also, the data may be streaming. In a streaming video communications session application, each User A-F may have one or more cameras, telephones and/or microphones from each of which is streamed a continuous, real-time data on a particular multicast address and port number. As used herein the term continuous data stream is intended to broadly refer to a data stream sent in substantially continuous succession, although some degree of intermittency is contemplated.

For example, a packetized data stream in IP may be continuous and streaming even though there may be some delay between discrete packets.

Different protocol communications may be supported by the network 10 and the users A-F, including but not limited to ITU H.320, ITU H.323, ITU H.324, SIP (session initiation protocol), RTP (real time protocol), RTSP (real time streaming protocol), RTTP (real time transport protocol), HTTP (hyper text transfer protocol) and other suitable protocol for initiating and communicating real time and streaming data. It will be appreciated that when used in this context, the term "communicated" is intended to be broadly interpreted and does not require direct communication. For example, a first User A may communicate data to a second User B, even though the data passes through a number of intermediate nodes between origination and final destination.

Figure 2:
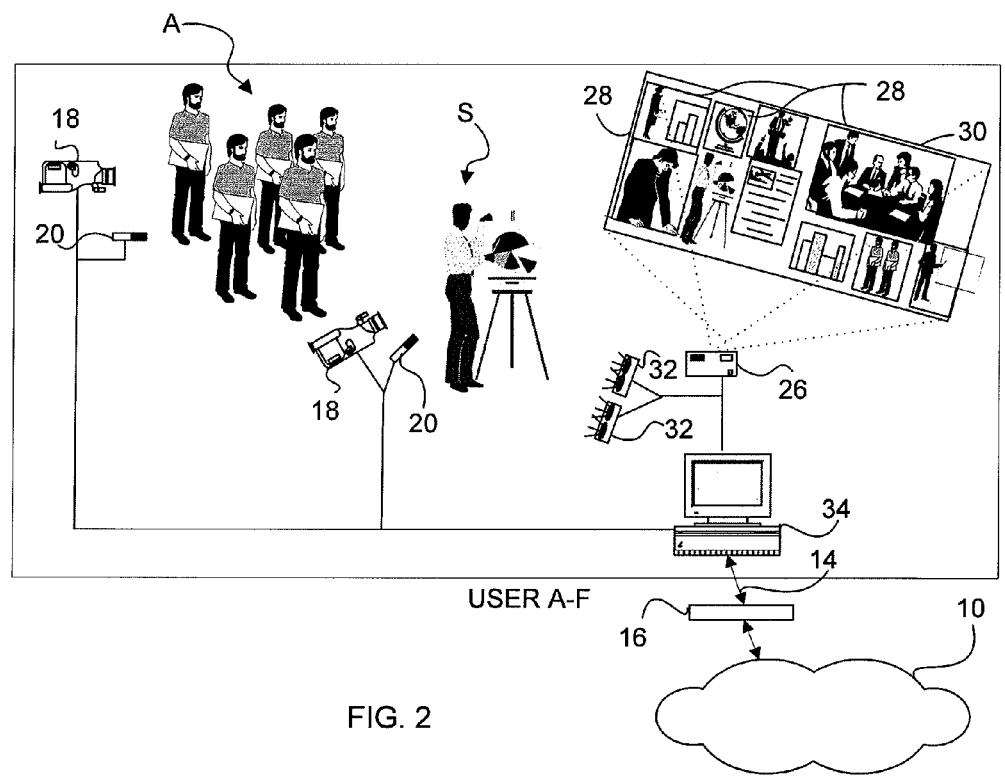
FIG. 2 is a schematic of one example video conference attendee room useful to illustrate practice of some embodiments.
Figure 3:
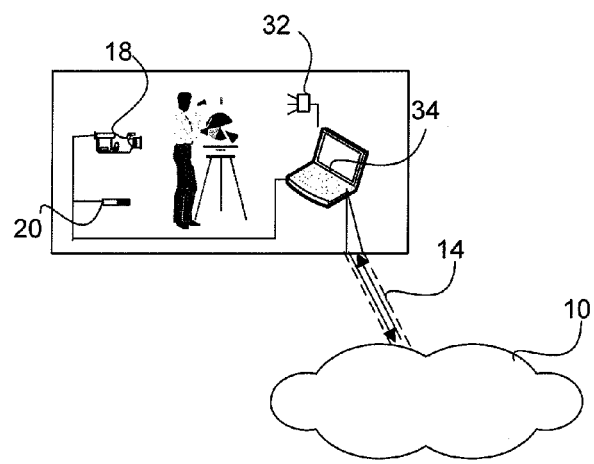
FIG. 3 is a schematic of a second example video conference attendee room useful to illustrate practice of some embodiments.

Communications of the streaming data between Users A-F may be further appreciated through consideration of FIGS. 2-3 that schematically show some representative configurations of the Users A-F. As shown by FIGS. 2-3, the Users A-F may be conference rooms, class rooms, or other spaces in which multiple individuals gather to participate in the video communications session with other individuals that are located at others of the Users A-F. FIG. 3 illustrates an alternate configuration in which a single individual is participating in the conference from, for example, a vehicle (such as an auto, truck, train, plane, boat, etc.), a home office, a hotel room, or other location. Each of the Users A-F can use one or more cameras 18 that are directed at an audience A, an instructor S, or other things or people. In FIG. 3, only an audience A is present (which may be only one individual—or may be more).

Many different cameras will be appropriate for practice of example embodiments, with suitable examples including those available from LOGITECH Co., Fremont Calif. (e.g., Logitech QuickCam Pro 4000), the MICROSOFT LifeCam VX-1000, the SONY EVI D100 series and/or the CANON VC series of remote pan/tilt cameras, and the like. With reference to FIG. 2, the cameras 18 at one User A-F may be trained on different people or things at that location, with an example being one camera 18 at an audience A and one camera 18 at a speaker S. The cameras may be controllable remotely, so that User A may be able to direct the direction of a camera 18 at User B, for instance. At other locations, with examples shown in FIG. 3, only one camera 18 is present.

In FIG. 2, two microphones 20 are provided—one for receiving audio from the instructor S and a second for receiving audio from the audience A. There are a wide variety of suitable microphones available for practice of embodiments of the system, including by way of example SONY ECM microphones, PHOENIX Duet microphone, POLYCOM microphones, and the like. Although not illustrated, those knowledgeable in the art will appreciate that other cameras, microphones, computers, gateways, firewalls, mixers, multiplexers, and like devices may also be present depending on desired video communications session details and other factors.

With reference to FIG. 3, only a single camera 18 is provided and a single microphone 20 along with a laptop computer 34. This might be useful for allowing an individual to participate in a video communications session from a home office, while traveling in a hotel room or on a plane, or the like. The camera 18 (such as a LOGITECH QuickCam) and microphone 20 might be combined on a laptop mountable unit, for instance, and the speaker 32 (and an alternate microphone 20) might be headphones worn by the user. Suitable headphones include those available from PLANTRONICS Corp. This example configuration is particularly convenient for portable participation in video communications sessions.

In an example video communications session such as a videoconference, each of the Users A-F not only sends streaming video and audio data, but likewise receives streaming video, audio, and other data communicated from some or all of the other Users A-F. Referring once again to the schematics of FIGS. 2-3 by way of example, one or more projectors 26 may be provided to project real-time video images 28 from one or more of the other Users A-F on a screen 30.

There are a variety of suitable projectors widely commercially available, with examples including those from INFOCUS Co. such as its LP series, TOSHIBA TDP series, NEC MT series, SHARP PG series, and IBM projectors. The projectors may have specification as are appropriate for a particular application, with an example being having at least 2000 lumens and XGA resolution. Also, it will be appreciated that use of a projector to display output images may easily be replaced with use of a monitor on which output video images are viewed. For example, FIG. 3 illustrates a laptop computer 34 the monitor of which may be useful to display output video data streams 28 from others of the Users A-F. Other larger size monitors may also be useful for display of video data, with examples including standard cathode ray tube monitors, 19", 40", 50" and larger plasma, LCD and other technology monitors. One or more speakers 32 may also be provided to play real-time audio from the other users or other sources.

Any number of video images may be provided that show video data in real-time from any number of other cameras or other sources located at the other users. For example, the user A may simultaneously display output video data streams 28 from each of the other users B-F, or may choose to display on a select subset of those streams. The display of streams may be set as desired, with different output display streams 28 located in different locations on the display 30. Further, the output video streams 28 may include charts, graphs, documents, other digital files, replayed video files, and the like.

Digital documents such as charts, word processor documents, spreadsheets and the like may be input to any of the computers 34 at any of the Users A-F for display at all or some of the other Users' locations. Likewise, digital images, including stored video streams and digital documents, for instance, may be stored in a memory accessible over the network 10 for replaying during the video communications session at any or all of the Users A-F. Output video streams 28 may be manipulated as desired, with examples of manipulation including moving the images, resizing the images, and the like.

A particular example of a data file in addition to audio and video data includes shared files (sometime referred to as documents) having text, images, numerical values, and the like. For example, within a videoconference or virtual meeting different of the Users A-F at different locations may desire to all work on a single document. In such circumstances, the single document may be described by a shared file stored on the network and which can be modified by any of the Users A-F. Each User A-F receives continuous updates of the document so they are aware in close to or at real-time of modifications and the current state of the document.

A variety of other shared files may be useful in conducting collaboration events within practice of the system. It may be useful, for example, for each of the Users A-F to know in or close to real-time which other Users are connected to the network 10 and available for conferencing. This can be accomplished through maintaining a shared user presence file on the network 10 that is regularly updated to reflect currently available Users A-F. Users A-F also receive regular updates of the shared user presence file to indicate current status of other Users. Other examples include shared files maintained on the network 10 that list the current status of hardware at each of the Users A-F (e.g., which of cameras 18 and microphones 20 are on, what their settings are, etc.), chat applications, and others.

Embodiments of the invention may include other users (not shown) that participate in a videoconference but that do not communicate both audio and video (or other types of) data. An example includes a conference attendee (not shown) that participates over a phone together with Users A-F via audio data only. Accordingly a videoconference carried out according to systems and methods of the invention may include a plurality of users (such as A-F) that each communicate audio and video data to each other, as well as an additional user(s) (not shown) that participate by audio only (or video only, or some other limited set of data communication), with an example being a phone participant utilizing audio data only.

The one or more computers 34 at each of the Users A-F may be used to receive and send all of the video, audio, documents, digital files and other data at the standard user A. The computer 34 may be referred to as a client computer or client, although as noted above it may also function at times as a server with the computer 12 being a client. A variety of computers that are currently commercially available will be suitable for use as computer 34, with examples including the Dell Precision 470 with dual processors and the HP Workstation XW6000 dual processor.

As with the computer 12, the computer 34 is intended to be broadly interpreted and is not limited to a single, desktop type computer as illustrated. Other devices that include a processor capable of executing instructions may be used, although they may sometimes be referred to as a device other than a "computer." Accordingly, the term "computer" as used herein with reference to computer 34 (and computer/server 12) is intended to be broadly interpreted. Examples include, but are not limited to, media communications devices having a processor, communications devices such as processor enabled phones or personal digital assistants, processor based gaming devices, and the like. Further, the computer 34 may be comprised of two or more computers linked to one another.

An application program, including one or more codecs, are running on the computer 34 to provide signal coding/decoding, compression/decompression, to coordinate receiving and sending of the data streams, and to control other aspects of sending and receiving of the data streams. For example, the computer 34 may be used to control which or how many video images 28 are displayed on the screen 30, to size the images 28, to set audio levels for the speakers 32, and the like. Each computer 34 may be running a video codec, an audio codec, other codecs, one or more application programs, and other programs. These may be combined into a single application program or may be separate from one another. The computer 34 may also have video and audio capture cards, with an example being WEBCAM Corp. 4 input video capture card.

According to the configurations of FIGS. 1-3, a communications session such as a videoconference or other virtual meeting can occur between two or more of the Users A-F. The Users A-F may virtually "attend" an immersive and extensive virtual meeting that includes audio, video and/or other streaming data shared in real-time. Participants at each of the Users A-F may simultaneously hear and/or view data from all others of the Users A-F. As discussed above, one or more Users A-F may collaboratively work on one or more shared documents held on the network 10 with each receiving regular updates of modifications made by others. Such meetings may be desirable for corporations, universities, government, and other groups of people located remotely from one another that find it useful to interact in an environment that allows a greater level of intimacy than an audio-only phone call or a single image video conference.

Applications for use of video communications sessions of the present system include, but are not limited to, distance learning, medical consultation, industry collaboration, social interaction, government or university collaborative research, entertainment, gaming, financial market trading, and the like. In a distance learning application, a professor at one site (e.g., User A) may be able to take questions from students located at many additional sites (e.g., Users B-F), which can be locally located (e.g., different rooms or buildings in same campus) or very far from one another (e.g., different cities, states or countries).

In some communications sessions of the system, each of the sites can view and hear all of the other sites. In a medical consultation application, doctor specialists from around the country can participate in the diagnosis of a particular case. X-rays can be viewed by all, and each doctor at each location can discuss the case with all of the other participating doctors. In an industrial collaboration application, remotely located engineering, marketing, management, and labor teams may all discuss development of a new product. Each site may ask questions of any other site, and each site may submit documents and charts covering aspects of the project for which they are responsible.

Referring once again to FIG. 1, when a collaborative communications session such as a videoconference occurs between the users A-F, multiple video, audio and other data streams may be communicated between the various users and over the computer or conference server 12. A rich, immersive, and extensive virtual meeting environment may be provided that includes video, audio, and other streaming data shared in real-time between multiple participants at multiple locations. Participants at each of the users A-F may simultaneously view and hear data from all others of the users A-F. Such meetings may be desirable for corporations, universities, government, and other organizations that have groups of people located remotely from one another that need to interact in a somewhat detailed manner.

When conducting such virtual meetings, relatively large amounts of communication bandwidth may be required. Referring to the examples of FIGS. 1 and 2, in some embodiments each of the several cameras and microphones at each of the users A-F may be sent as a streaming real-time data stream to each of the other users A-F. In this manner, each user A-F receives multiple streams from all other users A-F. By way of illustration, Table 1 summarizes the data communicated between the user A and all other users B-F in one example configuration:

|  | Outgoing Data Streams: | Incoming Data Streams: |
| --- | --- | --- |
| User A | 2 Cameras, 2 Microphones, 1 application = 5 total | 25 streams (5 each from Users B-F) |

As a result, in an example meeting occurring according to the configuration of FIGS. 1-2 wherein each of the users A-F are meeting with one another, each user A-F is simultaneously streaming five discrete data streams out across the communication line 14 while also simultaneously receiving 25 discrete data streams (five from each of the five other users) across the line 14. The bandwidth required for each of the communications lines 14 can therefore be substantial. In some configurations, all of the audio streams from each site may be bundled together for convenience. For example, data streams A4 and A5 (MIC 1 and 2) may be bundled into a single stream.

It will also be appreciated that the schematic of FIG. 1 is simplified, and that in typical practice communication between users A-F over the communications lines 14, network 10, and bridge 12 may be routed through a plurality of computers, routers, buffers, and the like. For instance, each communications line 14 may include multiple routers and buffers between users A-F and the network 10. One advantage of IP protocol communications is that each individual packet of data includes a destination address and may be routed over any of several available paths between origination and destination. Accordingly, each of the communications lines 14 may vary somewhat for different packets—some packets may traverse a different path than other packets between the same source and destination. Further, it will be appreciated that virtual meetings such as videoconferences may include different numbers of users than users A-F illustrated, and may, in fact, include tens, hundreds, or even more users. With larger numbers of users the traffic load across communication lines 14 increases.

It will also be appreciated that the network 10 and communications lines 14 may not be dedicated to only the virtual meeting or videoconference taking place, and may not be dedicated to the users A-F and the network 10. Many other users may be sharing each communications line 14 to communicate with the network 10. There may be substantial additional data traffic taking place over the communications line 14 during the videoconference or virtual meeting. This additional traffic may compete with the data streams being communicated between the users A-F for the bandwidth and other network resources available over the communications lines 14 and network 10. At times, insufficient bandwidth may be available to carry all of the competing traffic over one or more of the lines 14, with the result that congestion causes some traffic delay or even loss. This can lead to an unacceptable quality of communications between the users A-F.

Another factor affecting the bandwidth and other resources consumed over the network 10 can be the applications used at each of the users A-F during the video conference. Various applications may be provided for use during the video conference, including for example a shared whiteboard on which each user draws, recorders, a chat board for exchanging textual messages, file transfer tools for exchanging files, games and gaming applications, video viewers, and the like.

Processing of audio and video communications may also complicate communications during a video conference. Each user A-F may use a particular codec to process video and audio data, and may select a particular compression ratio for the data. When the data is received by another of the users A-F, it may be necessary for that user to have a compatible codec to "decode" the data.

These and other factors can complicate multiple user video conferences over the network 10. Communication of excessive data can exceed (or nearly exceed) bandwidth capacities. Also, all users A-F may not have the same bandwidth capacity, with the result that capacities with some users A-F may be exceeded while others are not. If some users A-F select codecs that are not compatible with the codecs at other of the users A-F, the receiving user may not be able to decode the data. The ability to manage these and similar problems can grow exponentially with the scale of a conference. As can be appreciated, when the number of users at a meeting is only 3 the task is much more manageable than when the number is 300.

To address these and other issues, some embodiments of the invention comprise video conference systems, methods and program products that include communications control parameters that establish limits or settings for communications between users. In some embodiments, a layered or hierarchical arrangement of control parameters has been discovered to be of particular benefit. In one example embodiment, a first or highest level of control parameters may be set to control all videoconference communications occurring over the server 12, regardless of what user the communications are sent from or to, and regardless of which meeting they occur during. A second, lower level of control parameters may be set that apply only to particular users or to a particular meeting. This second lower level may be or include a subset of the first level, and may not violate the highest level of parameters. The control parameters set in the first and/or second levels of control may include parameters useful for managing audio, video and other data being communicated during videoconferences, including (but not limited to):

A maximum overall bandwidth limit

A maximum per user bandwidth limit

A maximum per conference bandwidth limit

A maximum cumulative total number of data streams (video, audio, and/or others; either upstream or downstream)

A maximum number of data streams (video, audio, and/or others; either upstream or downstream) per user A maximum number of data streams (video, audio, and/or others; either upstream or downstream) per conference A list of allowed codecs (video, audio, and others) for use video and audio compression limits data type priorities video and audio resolution limits security settings (e.g., encryption, password)

a list of features that are allowed (or not allowed) to be used during a conference a list of applications that are allowed (or not allowed) to be used during a conference maximum number of conferences per site (or group—e.g., maximum for Austin office)

maximum number of conferences per day (expressed universally—for entire system; per user; or per group)

maximum number of applications or features (per user, per group, per conference, or universally)

and others

Further levels or sets of parameters may be provided within the hierarchical arrangement of levels. By way of example, if a first level of parameters applies to the server 12 (or server group 12), a second level may apply to individual users A, B and C only, and a third level may apply to one particular video conference that occurs between users A-C. Further levels may also be provided. A rule set or other logical relations can reflect a hierarchical arrangement between the layers. For example, in some embodiments, the first level establishes an allowable universe of parameter values. If the first level sets a maximum per user limit of 3 video data streams for the server, for example, neither the second level nor the third level can exceed this. These and other aspects of embodiments of the invention can be further appreciated through the following illustrative examples.

Figure 4:
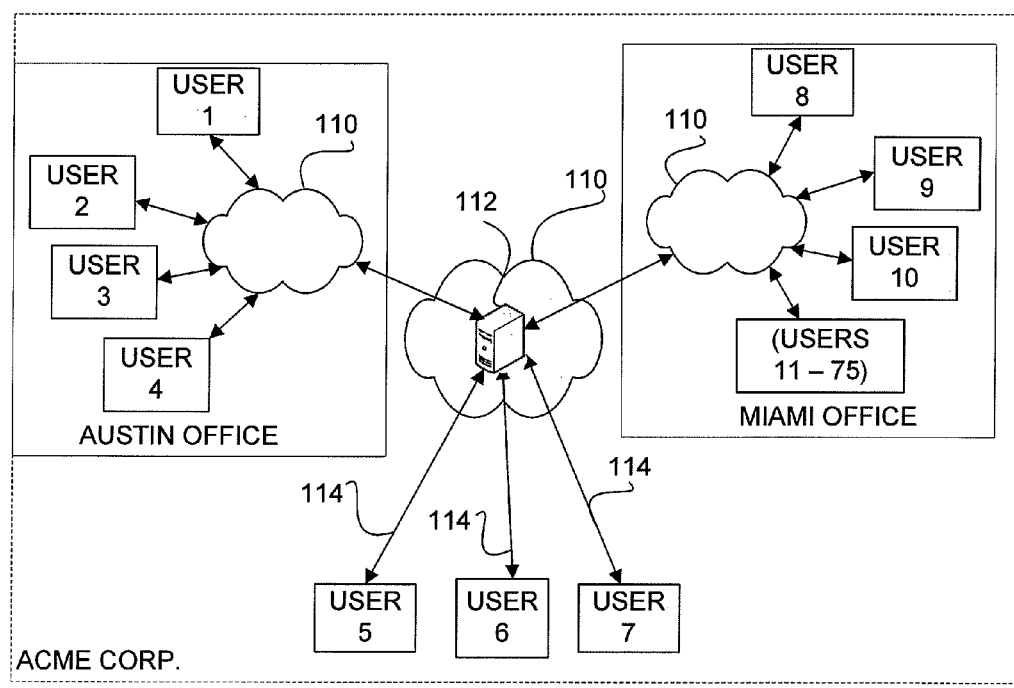
FIG. 4 is a schematic of a network useful to illustrate example embodiments of the invention.

FIG. 4 is a schematic of an example network useful to carry out a videoconference and to practice embodiments of the invention. Many aspects of the network are consistent with the network 10 illustrated and discussed above, with like numbers used in the 100 series for convenience. The network 110 includes one or more conference servers 112 over which any number of users 1-75 can jointly participate in a video conference in which real time audio and video data is shared between users. Each of the users 1-75 may be considered to be consistent with one or more of the users A-F illustrated and discussed above. Some or all of the users 1-75, for example, may be desktop systems, conference rooms with multiple cameras and microphones, a laptop system, a mobile user in a vehicle (such as an auto, plane, boat or a train), and the like.

The system illustrated by FIG. 4 may be an organization such as a university or corporation with multiple offices. It has been identified as the "Acme Corp." in FIG. 4 for illustration, and two example offices have been illustrated as Austin Office 150 and Miami Office 152. Each office 150 and 152 may also include networks 110. Each of the networks 110 may be, for example, a LAN or WAN, and/or the networks 110 may each be LAN's and collectively form a WAN. For purposes of practicing videoconference embodiments of the invention, the three networks 110 may be treated collectively as an individual network 110. Other offices may also be connected to the network 110, as well as traveling executives, work-at-home salespeople, and the like. These can be represented by one or more of users 5-7.

The network 110 and conference server 112 facilitates videoconferences between any two or more of the users 1-75 in which the individual users can share one or more video and audio data streams with one or more of the other users 1-75.

Each of the users 1-75 is registered with the one or more conference server 112 for participating in videoconferences with one another. Registration may include acquiring client software for participating in the videoconference, providing contact information (such as an IP or other electronic address) to the server 112, acquiring a user name, and the like. The conference server 112 may store registration information in a memory, with an example being in a table format in the memory.

Figure 5:
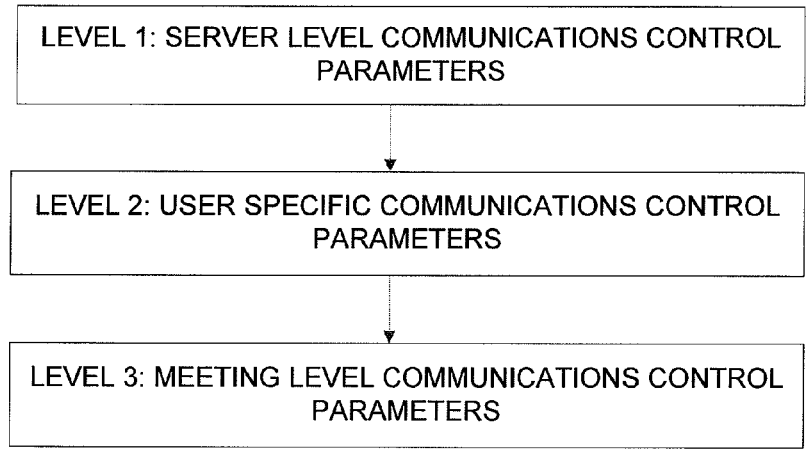
FIG. 5 is a chart illustrating one example scheme of parameter levels or sets.

FIG. 5 is an example hierarchical or layered parameter control arrangement for managing communications during video conferences over the network 110. FIG. 5 shows a first set or level 1 of this example parameter control arrangement. In the example of FIG. 5 this level 1 is also the "highest" in the hierarchical arrangement of parameter control. It represents control parameters set for the one or more conference servers 112 that apply to any videoconference communications that occur over that server 112, regardless of user or conference.

Put another way, the parameters of this first level set an absolute limit for videoconference communications between the users 1-75 and during any meeting they may participate in using the conference server 112. In many example embodiments, the first level of control parameters may be changed as desired. These parameters may be set or adjusted by anyone provided access to the control parameter setting function. This may be, for example, a network administrator, any of the users 1-75 that is provided access to the control parameter setting function, a remote user, or the like.

The control parameters may be set, for example, through use of a graphic user interface operating on a computer in operative connection with the server 112. This can be, for example, the conference server 112 itself, another computer connected to the network 110 (with examples being any of the users 1-75 or another computer in connection with the network 110), or the like. In many example embodiments, limited access is provided to this functionality for purposes of secure network management and others. Such access may lie in the form of passcode or password protection. Setting of control parameters can occur through other steps as well. A file can be communicated to the server 112, for example, that includes parameter settings. Another alternative is that in some embodiments steps of auto discovery may be carried out in which the server 112 performs a discovery process by measuring certain aspects of the network 110 to determine appropriate parameter values. Default values can also be set for the server 112.

FIG. 5 illustrates two lower levels or sets of parameter control—level 2 for user specific control parameters which are set for specific users, and level 3 for conference specific control parameters set for a particular conference. These are subsets of communications control parameters under level 1. The control parameters within these levels lie within, or at least include some parameters that lie within, the universe of parameter settings of level 1. Put another way, the limits set in level 1 may not be violated by parameter settings in these lower levels.

As used herein, the term violate is intended to be broadly interpreted as being outside of an allowed range or not equal to a specified value(s). A first value could violate a limit if it was greater than a maximum, less than a minimum, or not equal to specified values. For example, if a maximum limit of 5 is set, then a value of 6 violates that limit. A minimum limit of 3 is violated by a value of 2. If a setting must equal A, B or C, then an input setting of D violates that setting. If a parameter in level specifies what a setting cannot equal, then that setting is violated by a lower level parameter if it is set to equal a value not allowed (e.g., if level 1 specifies that X cannot equal A or C, that is violated if in level 2 X is attempted to be set equal to C). Parameters may be set using Boolean or other logical operators (e.g., set as "true," "false," "not equal," etc.)

Also, not all of the parameters available in level 1 may be accessible in levels 2 and 3. In many example embodiments, the parameter settings of level 2 user specific settings may be set by network administrators and others provided access to this functionality. In some embodiments, this may be the same individual or individuals that have access to the level 1 control parameter setting functionality. In other embodiments, however, it may be desirable to limit some parameter settings to only high level access at level 1 and not allow any further access in lower levels.

Further, lower levels may include parameters not included in higher levels. Depending on what each level represents, it may be useful to set parameters on a particular level that were not set or used on another. Level 3 may include a volume parameter, for example, that is not included on levels 1 or 2. As long as lower levels include at least some parameters that are included on higher levels, however, those lower levels can be characterized as including a subset of parameters from a higher level.

Parameters for a particular level also need not apply to all users. In the present example, the level 2 user specific parameters set control parameters that apply only to a subset of the users 1-75 communicating over the network 110 and conference server 112. Put another way, the user specific parameters of level 2 apply only to a subset of the universe of users and videoconferences that that the parameters of level 1 apply to.

If, by way of example, particular bandwidth or other resource limitations apply to the Austin Office 150 or to one or more of the users 5-7 but do not apply to others of the users, corresponding control parameters may be set for only those users they are necessary (or desired) for. This might be desirable, for instance, if the Austin Office network 110 is particularly congested with existing data communications. To help alleviate such congestion, control parameters for users at this office could be set to limit the amount of audio and video data they can send and receive during a video conference to avoid over burdening the Austin Office network 110. Because similar congestion concerns presumably do not exist at the Austin office, it is not necessary to set level 2 user specific parameters for these users. Also, different sets of parameters may be created at one level to apply to different users or groups of users.

Level 3 parameters are set for specific conferences. In the example embodiment of FIG. 5, the meeting specific control parameters of level 3 are the "lowest" level of parameters. These accordingly cannot violate the parameter limits set in either of level 1 or level 2. Also, in many example embodiments, the ability to set these conference specific parameters in this level is more widely available than are the setting functionality of levels 1 and 2. In some embodiments, only a network administrator or similar centralized position is allowed to set the level 1 and level 2 parameters. The conference specific parameters of level 3, however, may be provided wider access. These can be set for each meeting or videoconference that is set up for conducting over the network 110. In some example embodiments, these parameters might be set by any user who is attending the videoconference, by whichever user is initially setting up the videoconference, or the like. These parameters can be useful, for example, to tailor a particular conference to what is expected to occur during that conference in terms of material to be presented, data to be shared, number of attendees, amount of expected feedback from attendees, and the like.

Figure 6:
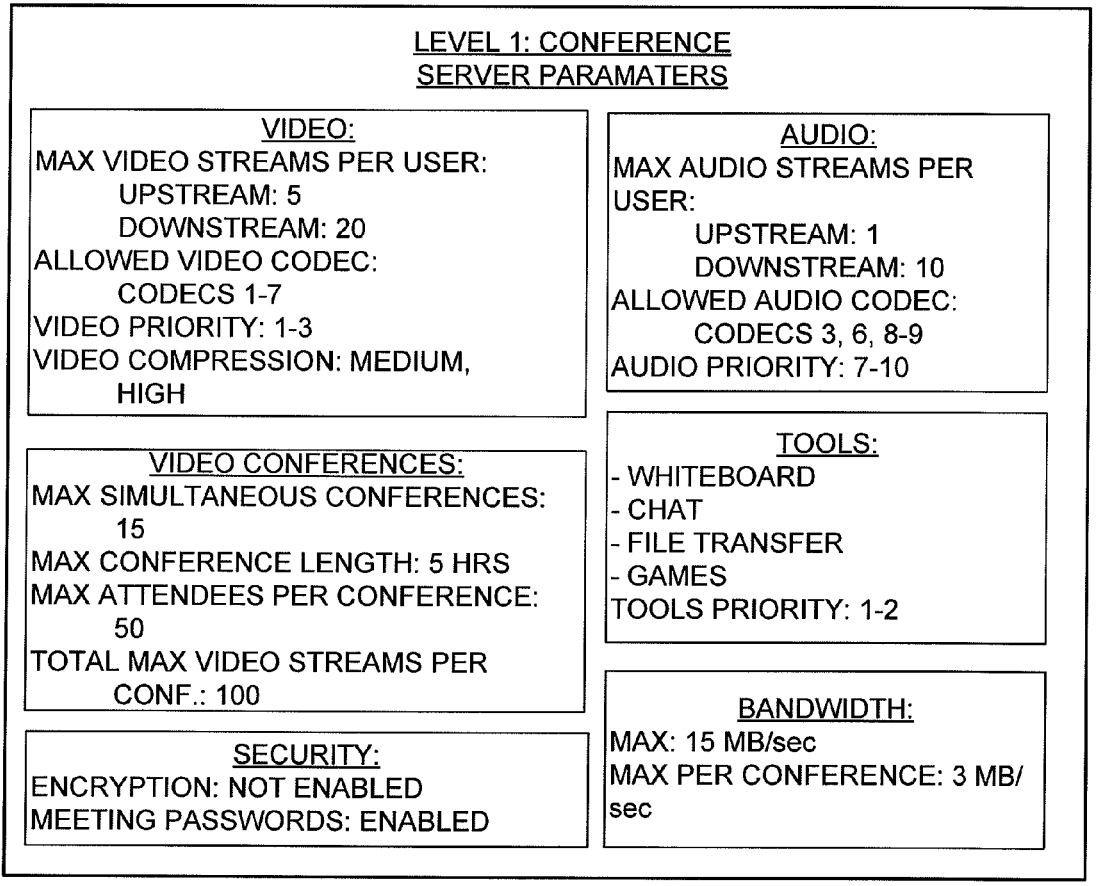
FIG. 6 illustrates one example set of communications control parameters.
Figure 7:
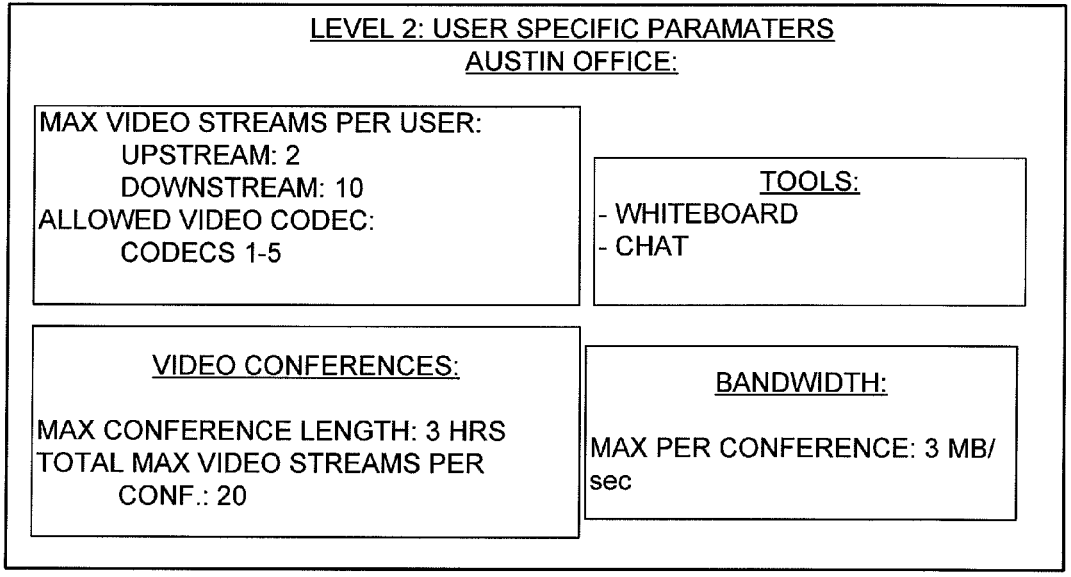
FIG. 7 illustrates a second example set of communications control parameters.
Figure 8:
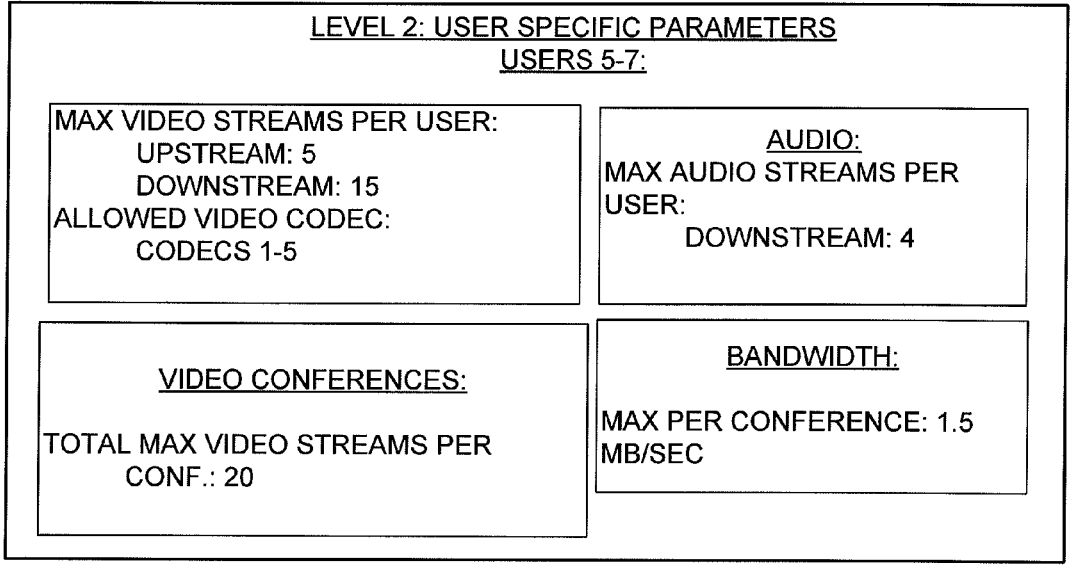
FIG. 8 illustrates a third example set of communications control parameters.

The relationship between the different hierarchical levels illustrated in FIG. 5 and further details of each example level may be better appreciated through consideration of FIGS. 6-8, each of which represent one example set of parameters for levels 1-3, respectively. Each may be, for example, a screen from a graphic user interface useful to set the parameter limits. Referring first to FIG. 6, one example set of level 1 conference server parameters is provided. It will be appreciated that this set is an example only, and that other embodiments may include fewer, more and/or different parameters.

The parameters of FIG. 6 are arranged into several different categories, including "Video," "Audio," "Video Conferences," "Tools," "Security," and "Bandwidth." Fewer or additional categories can be provided in other invention embodiments. The video parameters include a maximum number of video streams per user (or conference attendee) in terms of streams communicated from ("upstream") and to ("downstream") each user. Video parameters also include a list of permissible video codecs, allowable priority values for video data, and permissible video compression settings. Priority settings may be in any of a variety of different formats.

Generally, priority values specify what relative priority video data may be treated with as compared to other types of data. In the present example, priority settings vary between 1-10, with 1 lowest and 10 highest. Data packets may be tagged with priority values, with routers and other network resources communicating higher priority data before lower. In this manner, when network congestion occurs, some control over what data is preferred for communication is available. In many example videoconference embodiments, it is generally preferred to drop video data for the sake of communicating audio data. User experience generally favors smooth audio and choppy video over the opposite. Audio control parameters of FIG. 6 likewise specify maximum upstream and downstream audio streams per user, permitted audio codecs, and permitted audio priority values. In the illustrated example, audio priority is permitted to be values that are higher than those for video.

Video Conference control parameters specify parameters such as the maximum number of simultaneous video conferences that can occur over the network 110, the maximum conference length, the maximum attendees per conference, and the maximum total video streams permitted during a video conference. Other parameters can also be specified, with examples including the maximum number of audio streams to be communicated during a conference, others discussed herein above, and the like.

The "Tools" category in the example of FIG. 6 refers to various applications which are permitted to be used during videoconferences occurring over the conference server 112. In the example of FIG. 6, these include a whiteboard application (in which attendees can collaborate on a common drawing), a chat application (in which attendees can share text messages), a gaming set of applications (in which users can participate in any of a number of games), and a file transfer application (in which attendees may transfer files over the network to others of conference attendees). Many further applications are possible, including video playback, recorders, modeling, and others. The "tools" set of parameters also includes a priority value setting for applying to tools data. A "security" set of parameters specifies whether data encryption can be used, and whether passwords for conference attendance are enabled. A "bandwidth" category includes limits for maximum bandwidth to be communicated over the conference server at any one time, and maximum per meeting bandwidth. Many other applications can be used in other embodiments.

FIGS. 7 and 8 illustrate the example parameter set of level 2 user specific parameter setting of FIG. 5. In the example of FIGS. 7-8, user specific parameter settings have been specified for two different subsets of the users. FIG. 7 illustrates parameter settings for the Austin Office (FIG. 4) and FIG. 8 for the users 5-7 (FIG. 4). Accordingly, it will therefore be appreciated that the level 2 user specific parameters of FIG. 5 may be set for different subsets of users using different parameters and values. In the examples of FIGS. 7 and 8, FIG. 7 includes control parameters for all users at the Austin office, and FIG. 8 for users 5-7. As discussed above, this second level of parameter control may be useful to tailor videoconferencing to particular needs or limitations of various subsets of the users. The parameters set in this level 2 cannot violate those set in level 1.

FIG. 7 illustrates the control parameters set for the Austin Office. These parameters include some different Video, Video Conference, Tools and Bandwidth settings than are set in level 2 for users 5-7 in FIG. 8. For example, the parameters of FIG. 7 (Austin Office) limit the maximum number of streams to be communicated upstream to 2 and downstream to 10, while the parameters of FIG. 8 (Users 5-7) are limited to 5 streams upstream and 15 streams downstream. The Austin Office limits the tools for use during conferences to being only the whiteboard and chat applications, while no limitations on applications are presented for Users 5-7 in FIG. 8. These different parameters might reflect different bandwidth or other resources available at these different locations, different network management preferences, or other differences.

FIG. 9 illustrates example parameter settings for a conference. These might be set, for example, when a conference is being scheduled by one of the attendees. This might be done through a graphic user interface, for example, that is running on a computer connected to the network 110. Other steps for setting these parameters can also be performed, with an example being through communication of a file including the parameter values, auto discovery, and the like.

Conference server 112 or another computer on the network 110 may function as a reservation server that stores a list of conference reservations, reserves network resources required for videoconferences, and performs other functions useful to set up and reserve resources for videoconferences. As discussed above, parameters set for a particular conference, with examples including those shown in FIG. 9, includes a subset of parameters from levels 1 and 2 that cannot violate the settings made in those levels. The example parameters of FIG. 9 are set for a particular conference having the "conference ID" as shown. This may be a unique identifier useful to identify one particular conference to be held between the particular users shown and at the particular time shown over the network 110 and the conference server 112.

The example conference parameter set of FIG. 9 includes a subset of those above, but it also cannot include some of the parameters of those levels since they are not applicable to one particular conference. By way of example, the maximum number of simultaneous conferences specified at level 1 is not applicable to this third set of parameters since this set is directed to only one particular conference.

Also, although the example third set of parameters includes a subset of the first and second levels, in some invention embodiments further parameters may be included in this set that are not included in higher levels. For example, the conference ID, start time and attending users are included in the example set and are not applicable to levels 1 and 2.

Additionally, the example conference specific parameters of FIG. 9 include a "banned users" parameter. This specifies users that are not permitted to participate in the conference, and might be useful for security, managerial, or other purposes.

The hierarchical or layered relationship between the different levels of parameter settings may be further illustrated through consideration of a few examples. By way of a hypothetical example, assume that an "X parameter" is limited to a maximum value of Z and that a "Y parameter" is limited to being one or more of A, B, C, D or E. This establishes the universe of possible values for X and Y parameters for lower levels. This universe can be further limited, however, through settings made in level 2 (and/or 3). Level 2 might further limit the X parameter to being (Z-5) and the Y parameter to being A, B, C only for all or some of the users. Level 3 might further limit the X parameter to being "not equal to M," and the Y parameter to being A or B only.

Taking the Tools parameters by way of particular example, the conference server limitations of FIG. 6 establish the possible applications as whiteboard, chat, gaming and file transfer. As a result, any videoconference occurring over the server 112 and network 110 is limited to these applications—no additional applications can be added through parameter settings of Levels 2 or 3 (FIG. 5). The level 2 user specific parameter settings of FIG. 7 for users 1-4 at the Austin Office, for example, limits the tools for these users to only whiteboard and chat applications. No such further limitations are provided for any other users, since the user specific parameters of FIG. 8 for users 5-7 does not specify any further limitations for parameters, and no further user specific parameters are provided for users 8-75. As a result, users 8-75 have no further parameter limitations than those specified at level 1 (e.g., those of FIG. 6). The tools parameters are further limited through conference specific parameters set at level 3 for the conference having the conference ID 13455 illustrated by FIG. 9. As shown in this FIG., the tools parameters are limited to the whiteboard application only. As a result, users attending this conference will only be able to use the whiteboard application, even though a larger universe of tools applications was set at the conference server level 1 and user specific level 2.

This is further illustrated through consideration of the maximum conference length parameter. This was set on a global basis in level 1 as 5 hrs. (FIG. 6). For users in the Austin office, this was further limited to 3 hrs. in level 2 (FIG. 7). No other users were subject to further limitations on the maximum length in level 2. For the conference having the ID 13455, however, the conference length is limited to 1 hr.

In this manner some example embodiments of the invention provide a hierarchical or layered arrangement of parameter control for videoconferences. This has been discovered to provide useful benefits and advantages. For example, overall network performance can often be best ensured through a central and global conference server parameter settings established at level 1. Further flexibility is provided through provision of additional, lower levels of parameter setting such as the levels 2 and 3 illustrated above. It will be appreciated that many further levels can potentially be provided, with examples being a fourth, fifth, sixth, seventh, eighth, ninth, tenth, eleventh, and more. The number of levels will depend to a large extent on the particular application details. Also, the hierarchical structure can be altered as desired.

By way of example, the conference server level 1, user specific level 2, and conference specific level 3 illustrated above could be rearranged as desired. For example, the user specific level might be set as level 3 and the conference specific level set as level 2. Also, the conference server level might be set as level 2 or 3. Still further, additional levels might be established. A fourth, fifth and further levels can be provided. The user specific level 2, for example, might have further sub-groups, or particular groups within the Austin office might be sub-levels below the level 2 of FIG. 7.

It is additionally noted that FIGS. 6-9 show examples of parameters only. Other parameters may be set and maintained in this manner. The ones shown are examples only. Also, all parameters from level 1 (FIG. 6) have not been illustrated in levels 2 and 3 (FIGS. 7-9). It should be assumed that parameters not shown in a parameter set for a lower level are not altered from the higher level. By way of example, level 1 video compression parameters are set in FIG. 6 as medium or high. These parameters are not illustrated in either of level 2 or 3. As a result, these parameters are not altered in these levels and continue to apply to all users and conference ID 13455.

Also, in some invention embodiments the hierarchical parameter subsets can include different parameter members at different levels that are not necessarily in the level above, and each level can include multiple subsets. By way of illustration, consider the hierarchal embodiment having the following parameter arrangement:

|         | Members |   |   |   |   |
|---------|---------|---|---|---|---|
| Level 1 | A       | B | C | D |   |
| Level 2 |         | B | C |   | E |
| Level 3 | A       | B |   | D |   |
| Level 4 | A       |   |   |   | E |
| Level 5 | A       | B | C | D | E |

In this example, Level 2 includes the subset (B and C) of Level 1 although another parameter not present in Level 1 (E) is present. Level 3 includes the subset (B) of Levels 1 and 2, and the subset (A and D) of Level 2. Level 4 includes the subset (A) of Levels 1 and 3, and the subset (E) of Level 2. Level 5 includes the subset (A, B, C, D) of Level 1, the subset (B, C and E) of Level 2, the subset (B, C) of Levels 1 and 2, the subset (A, B and D) of Levels 1 and 3, and the subset (A and E) of Level 5. In this manner some embodiments of the invention may feature subsets of parameters on one level that are subsets of higher levels that are removed by one or more levels.

In many invention embodiments, all of the communications parameter settings from all of the three (or other number of) levels are maintained in a memory that is accessible over the network 10. In some embodiments, the different parameters are stored on a memory accessible by the conference server 112 so that the server 112 can enforce the parameters during a conference or at another time. Enforcement can occur, for example, during a videoconference when a particular process violates a control parameter. For example, level 1 parameters shown in FIG. 6 show the maximum number of video streams to be communicated upstream to be 5. If a user during a particular video conference attempted to communicate a sixth stream, this process would violate the corresponding control parameter. In some embodiments an error message would result and/or and the process would be terminated (i.e., the communication of the sixth video stream would be terminated).

By way of further example, the level 2 user specific control parameters for users 5-7 of FIG. 8 show the maximum number of video streams per conference to be 20, and the maximum bandwidth per meeting to be 1.5 MB/sec. If in a conference in which user 5 was participating a $21^{st}$ video stream was attempted to be communicated, in one example embodiment that process would be terminated with an explanatory error message. Likewise, if the total data being communicated during a conference exceeded 1.5 MB/sec, one or more processes would be eliminated until the bandwidth limit was no longer violated, or newly requested processes not initiated that would cause the limit to be violated. An explanatory error message can be provided.

Further, when terminating processes, some embodiments of the invention select which process to terminate according to a priority scheme. If a particular parameter is exceeded, the most recently initiated can be terminated. With an example being the number of video or audio streams uploaded per user, the most recently initiated stream may be terminated. As an alternative, the additional stream not initiated when requested if it would violate the maximum. When a more general parameter is violated, with an example being the total bandwidth communicated, application data streams may be terminated first, then the most recently sent video stream, with audio data the final option. Different priorities can be established based on user experience. Generally, video data is favored for earlier termination over audio since video consumes more bandwidth and consistent audio is generally more important to the quality of the user experience.

Input parameters may also violate an existing parameter when they are input. Referring to the examples of FIGS. 6-9 by way of illustration, the level 1 conference server parameters sets a maximum conference time length at 5 hours. This can not be exceeded by parameters set on lower levels. If a network administrator attempted to set a maximum conference length of 6 hours in the level 2 user specific settings for the Austin Office, in some embodiments an "error," "exceeds level 1 settings" or similar message would be conveyed and the parameter denied entry. A new parameter would be requested for entry. The existing level 1 parameter may be displayed as a guide for the limit.

Figure 10:
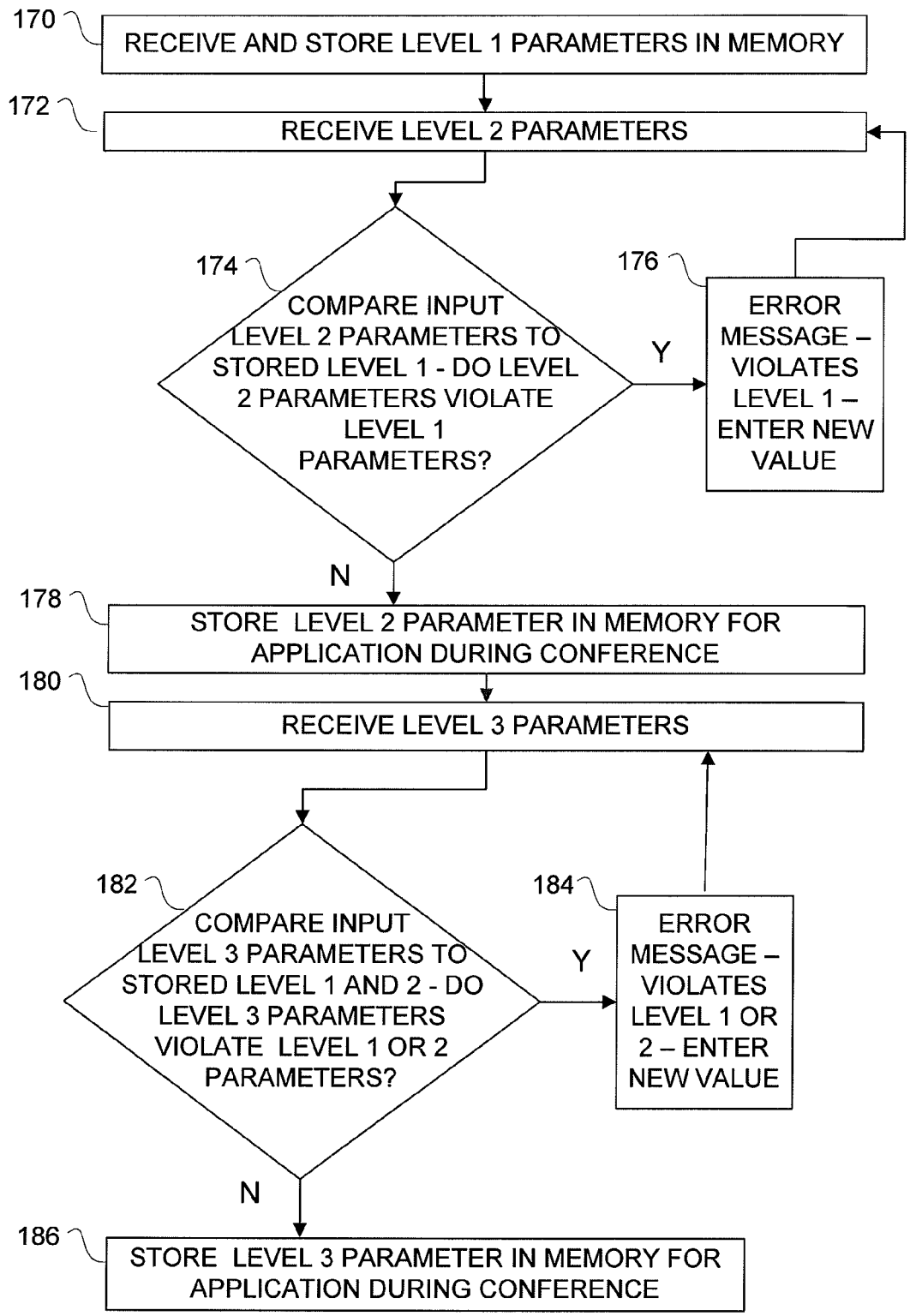
FIG. 10 is a flowchart illustrating example steps of a method, program product, and system of the invention.

FIG. 10 is a flowchart illustrating steps of an example method of setting communications control parameters of an invention embodiment. At 170, level 1 parameters are received and stored in a memory. This may occur, for example, through input received from a network administrator using a graphic user interface (GUI) running on a computer connected to network 110, through reception of a digital file, or through other means. Storage occurs on a memory accessible over the network 110. At 172 level 2 parameters are received. This may likewise occur via a GUI operating on a computer connected to the network 110 from a network administrator or another user, through receiving a digital file, or through other means. Some passage of time, with examples being minutes, hours, or days, may occur between the steps of 170 and 172.

A comparison is then made between the input level 2 parameters and the stored level 1 parameters. Block 174. A comparison is made on each individual parameter—level 2 maximum conference length to level 1 maximum conference length, etc. If an input level 2 parameter is found to violate the corresponding level 1 parameter, an error or similar message is generated along with a request to enter a new value. Block 176. The level 1 parameter may also be presented for guidance. Input level 2 parameters that do not violate the corresponding stored level 1 parameters are stored in a memory for application or enforcement during the conference. Block 178. Retaining them in the memory allows them to be referenced in the future, including for application or enforcement during a conference. This may be the same memory that the level one parameters were stored in, or may be a different memory accessible over network 110 (FIG. 4).

Parameters may be retained in the memory individually, one at a time, or the whole set may be stored at once. Individual retention can be advantageous in some applications so that only parameters that violate above limits are refused and others retained (e.g., the whole set is not rejected based on only one parameter violating a limit).

It is noted that the level 2 parameters, even if they violate level 1 parameters, may be at least momentarily stored in a memory with an example being a random access memory. Such storage may be necessary to compare the parameters to the corresponding level 1 parameters. The term "retained" as used herein in this context is intended to broadly refer to a more permanent storage than this, and can include, for example, storing in a memory for a period of time sufficient for future use in comparing level 3 parameters and/or videoconference communication parameter values.

Level 3 parameters are then input and received (block 180), which may likewise occur using a graphic user interface on a computer connected to the network 110 or through other means such as receiving a digital file including the parameter values. In the example of FIGS. 6-9, this may occur when a meeting attendee accesses the conference server 112 (FIG. 4) or a reservations server to set up a videoconference. A comparison is then made between the input level 3 parameters and the stored level 1 and 2 parameters. Block 182. A comparison is made on each individual parameter—level 3 maximum conference length to stored level 1 and 2 maximum conference length, etc. If an input level 3 parameter is found to violate either of the corresponding level 1 or 2 parameter, an error or similar message is generated along with a request to enter a new value. Block 184. The relevant level 1 or 2 parameter may also be presented for guidance. If none of the input level 3 parameters exceed the corresponding stored level 1 or 2 parameters, then the level 3 parameters are retained in a memory. Block 186. This may be the same memory on which level 1 and 2 parameters are stored, or may be a different memory. Some embodiments may include steps of building a table including all parameters for convenience of use and reference.

Some embodiments of the invention further include enforcing the control parameters during a videoconference. For example, if a videoconference were to run up against the relevant maximum length set by the control parameters of one of levels 1-3, the conference may be terminated. A warning message may be displayed a few minutes in advance of termination. A similar procedure is followed for other parameters. For example, if a maximum data communication rate is reached, one or more conferences, applications, video data streams, or users may be terminated. A warning message may also be displayed.

Referring once again to the example conference specific settings of FIG. 9, some embodiments of the invention include further steps related to excluding one or more classes of users from particular parameters. For example, some example embodiments further specify that the parameter settings made for conferences do not apply to one or more attendees at the conference. In some embodiments, the parameters may not be applied to the moderator(s) of the conference. The moderator may be, for example, the user that sets up the conference, that manages the conference as it occurs, that is responsible for presenting material to others, for choosing speakers, for maintaining an established schedule, and the like. In some embodiments, a moderator has the ability to expel an attendee from a conference by terminating their participation, and/or to ban particular users from attending or re-entering a conference.

In some invention embodiments, a conference moderator is not subject to the conference specific parameters of level 3 established for the conference in which he is the moderator, but is instead subject only to parameters set in levels 1 and 2. In the specific example of FIG. 9, the moderator is specified as user 44. As a result, user 44 is not subject to the parameters specified in FIG. 9 during conference number 13455, but is instead subject only to the parameters set in levels 1 and 2. By way of specific example, the moderator (user 44) can communicate 5 video streams upstream and communicate 20 video streams downstream during the conference as specified for level 1, although all other attendees at conference number 13455 will only be able to communicate 2 streams upstream and 2 streams downstream during the conference since these parameters are set for the conference in level 3.

It has been discovered that excluding a moderator from conference specific parameters offers surprising advantages and benefits. For example, in a multi stream videoconference that includes a multiplicity of users, it is often useful for the moderator to be able to view many video streams and choose which are appropriate for communicating to the overall conference attendees. Accordingly, a higher video stream communication limit is useful. This is applicable for other types of data and parameters in addition to video communications.

As a result, in some invention embodiments one or more classes of attendees (with an example being a "moderator(s)") are exempt from the conference specific parameters that are set for a particular conference. Other invention embodiments likewise exempt a class of attendee from parameters of other levels. For example, a network administrator(s) can be exempt from parameters set in level 1 or 2, a selected class of users can be exempted from security settings for other users, and the like.

Figure 11:
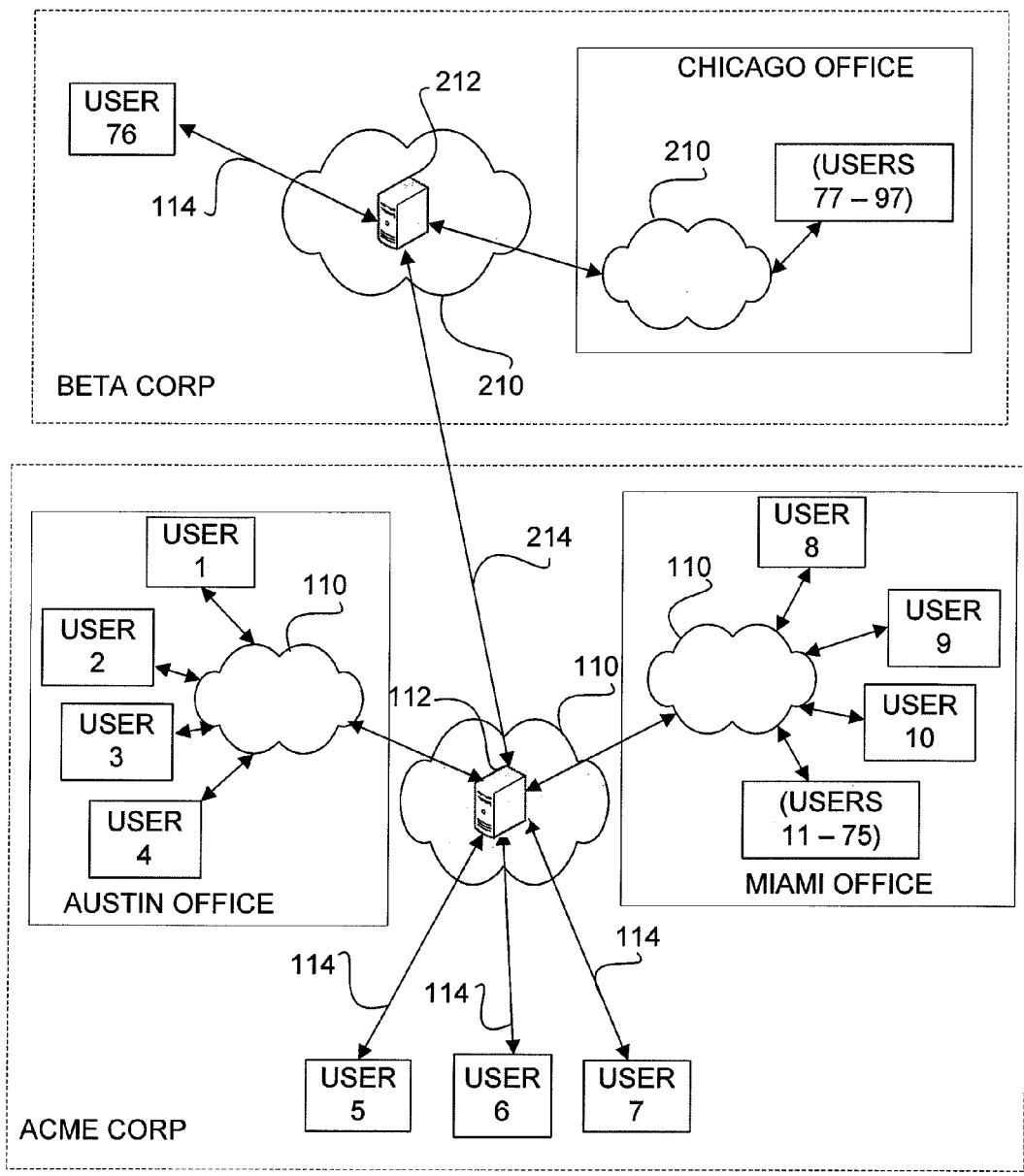
FIG. 11 is a network schematic useful to illustrate additional invention embodiments; and, FIG. 12 is an additional example parameter set.

Still other aspects of the invention are directed to methods, systems and program products for managing communications during video conferences when different control parameters exist. By way of example, when two different networks each have a different set of videoconference communications control parameters are connected to one another for performance of a video conference, determining which of the different parameters should apply to the video conference can be problematic. FIG. 11 is a network schematic showing the networks 110 of FIG. 4 in combination with a second network 210. In the example of FIG. 11, the two networks 110 and 210 represent two different WAN's with one each at different business entities—network 110 is at "Acme Corporation" and network 210 at "Beta Corporation."

Each network 110 and 210 have a plurality of individual users registered as illustrated. Each user is generally consistent with one or more of the users A-F described above and illustrated in FIGS. 1-3, and may include one or more cameras for capturing video data; one or more microphones for capturing audio data; one or more computers for processing, communicating audio and video data; a monitor or projector for displaying received video data; one or more speakers for playing received audio data; and other components useful for participating in a videoconference. As described above, the respective video conference server 112 at Acme Corp. and conference server 212 at Beta Corp. facilitate video conferences at the two corporations between users at those corporations. A hierarchical or layered arrangement of control parameters may be in place at each of the two corporations, with one example being the parameters of FIGS. 6-9.

Parameter control issues can occur, however, when the two networks 110 and 210 are connected to one another to facilitate a videoconference between one or more users from each of Acme Corp. and Beta Corp. The two networks 110 and 210 may be operatively connected in any number of suitable manners. Examples include connection through use of the internet, a third party network, a virtual private network link, the PSTN, and others. FIG. 11 illustrates such a connection through the linkage 214 which may be any of these or other useful connection. Once connected, videoconferences between any one or more of the users 1-75 at Acme Corp. and one or more of the users at Beta Corp. can be conducted.

Figure 12:
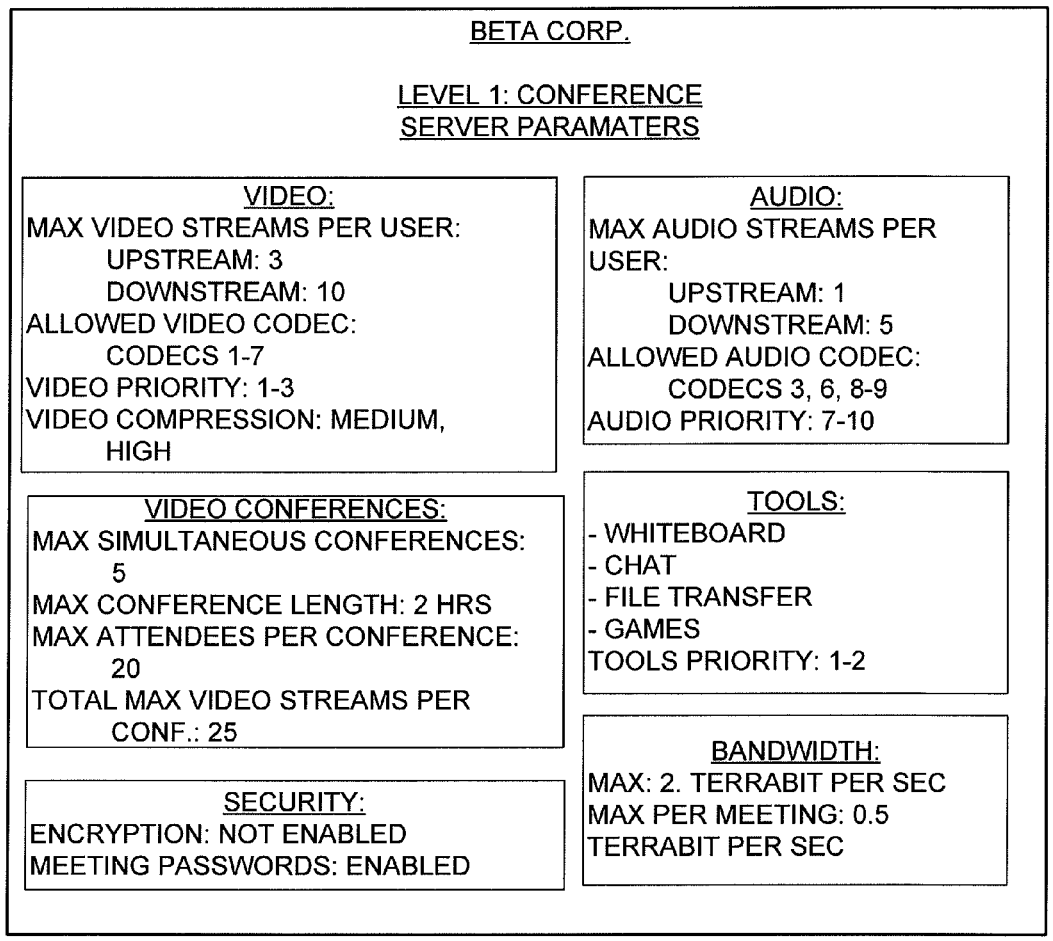

When conducting such video conferences, however, conflicts in communication control parameters may exist. Beta Corp. may have control parameters set on one or more levels in a like manner to Acme Corp. as discussed above with regard to FIGS. 6-9. By way of example, FIG. 12 shows level 1 conference server level control parameters for the Beta Corp. (assume that no level 2 parameters are set for any Beta Corp. users). These level one control parameters for the Beta Corp. establish the maximum video streams to be communicated from a user at 3. This is different than the level 1 control parameters set for the Beta Corp. as illustrated by FIG. 6, which set the maximum limit as 5 streams per user.

When setting up a videoconference between a user at Beta Corp. and a user at Acme Corp., a potential conflict therefore exists on the maximum video streams. Different embodiments of the invention resolve this conflict in different ways. One example embodiment compares control parameters and uses the lowest of the conflicting parameters as the control parameter. In this approach, the lowest parameter is applied as the relevant parameter limitation. In the example being considered, the Beta control parameter of 3 streams maximum would therefore be applied. Other embodiments use alternate approaches.

For example, some other embodiments adopt the parameters of the originating user as the relevant control parameters. For example, if a videoconference is being set up between user 5 at Acme Corp. and users 77-82 at Beta Corp. and is being organized by user 5, any conflict between parameters will be resolved in favor of user 5. Parameters applicable to that user will apply to the conference. Exceptions can be made for particular parameters that might risk disruption of the conference, with an example being maximum bandwidth communication.

Conflicts may likewise arise for a particular conference between users that are on the same network. Referring to the examples of FIGS. 7-8 that set level 2 user specific control parameters for two different groups of users within the Acme Corp., the maximum bandwidth control parameter differs. The maximum bandwidth for users at the Austin office is set at 3 MB/sec but only 1.5 MB/sec for users 5-7. Accordingly, if a conference is scheduled between user 5 and user 4, a conflict in the maximum bandwidth per conference will exist. Methods, program products and systems of the invention can resolve this conflict in a variety of ways. In some embodiments, the lowest of the two is used as the relevant parameter. This can be a preferred step in many embodiments since adopting a higher limit could threaten exceeding the capacity of one of the attendees. An alternative step is to adopt the control parameter of the initiating attendee. While this may be risky in some applications when the relevant parameter is bandwidth, for some other parameters this can be a less risky practice.

Still other embodiments of the invention, including systems, methods and program products, include further elements of measuring, recording and reporting usage of various features and resources during videoconferences. The features and resources may correspond to one or more of the parameters that are subject to setting in any of the levels. For example, the amount of usage of a whiteboard application, games, chat application, video replay application, recorder application, bandwidth usage, and others may be recorded during conferences for each individual user and cumulatively. Embodiments of the invention may also include elements of providing reports on the usage at desired times, with examples being monthly, quarterly and annually. These reports can be useful to administrators and others to ensure that resources are being allocated and used efficiently. Some embodiments of the invention further include elements of using usage reports to set parameters in one or more levels. As an example, if a usage report indicates that some or all conference users are using an application (with an example being a whiteboard or a chat application) at a very low usage rate, the administrator may set a parameter at level 1 (or another level) to disallow use of that application by one or more users during one or more conferences so that resources can be shifted to more heavily used applications.

Those knowledgeable in the art will appreciate the broad scope of the present invention as claimed below and that the representative collaboration event and video conference system, method and program product examples discussed herein are illustrative only. It will further be appreciated that many variations are possible within the scope of the invention as claimed herein below. The sequence of steps and arrangement of hierarchical levels of the example embodiments illustrated herein and in corresponding flowcharts, for example, could easily be altered. Also, some steps, parameters, and other elements may be omitted and others substituted. Equivalents to the steps and elements recited will be apparent to those knowledgeable in the art. Variable, file, level, set, and other element names have been used herein for convenience only, and these names should not be interpreted in a manner that unduly limits the invention.

What is claimed is:

1. A video conference system in which multiple users communicate video and audio data to one another over a data network, the system comprising:
   at least one conference server linking the plurality of users over a data network whereby each of the plurality of users can communicate at least one video data stream and at least one audio data stream to others of the users;
   a hierarchical arrangement of communications control parameters that control communications between the users over the at least one conference server comprising:
      a first level of communications control parameters that apply to all audio and video communications occurring over the conference server between the users;
      a second level of communications control parameters that includes a subset of the first level parameters that cannot violate the first level parameters, the second level of parameters applying only to a selected portion of video and audio communications occurring over the server between the users; and,
      wherein at least one of the first and second level of control parameters include a bandwidth limit and a number of video data streams limit.

2. A video conference system as defined by claim 1 wherein a plurality of users are registered with the one or more conference server for participating in videoconferences over the server, and wherein the second level of parameters applies only to a portion of the plurality of users.

3. A video conference system as defined by claim 1 wherein the second level of parameters apply only to one video conference occurring over the server.

4. A video conference system as defined by claim 1 wherein the plurality of users are divided into different groups, and wherein the second level of parameters includes two different sets of second level parameters, one each of the two sets of second level parameters applying to one each of two different groups of the plurality of users.

5. A video conference system as defined by claim 1 and further including a third level of communications control parameters that includes a subset of the first level of parameters, parameters from the third level not allowed to violate corresponding parameters from the first level or to violate corresponding parameters from the second level.

6. A video conference system as defined by claim 1 wherein the communications control parameters further include a maximum number of audio data streams allowed to be communicated during a video conference, a video resolution limit, data priority parameters, and a list of video codecs to select from.

7. A video conference system as defined by claim 1 wherein the second level parameters are set for a particular videoconference and apply to all attendees of the videoconference except for one or more meeting moderators.

8. A video conference system as defined by claim 1 wherein:
   the plurality of users includes at least five users;
   the at least five users communicate video data streams to all other users during a video conference conducted over the server wherein during a video conference between the at least five users, each of the five users thereby receiving at least four video streams from the other users, at least some of the five users able to communicate a plurality of different video data streams; and,
   wherein the control parameters specify the maximum number of video data streams that each of the users can communicate to the server during the conference, the maximum number of video data streams that each of the users can receive from the server during the meeting, and the maximum number of video data streams that can be communicated during the meeting.

9. A video conference system as defined by claim 1 wherein the plurality of users is a first plurality of users, wherein the conference server is a first conference server, wherein the hierarchical arrangement of control parameters is a first hierarchical arrangement, and further comprising:
   a second conference server having a second hierarchical arrangement of communications control parameters that is different from the hierarchical arrangement of communications control parameters that apply to the first conference server; and
   one or more rules that determine which of the first or second hierarchical communications control parameters apply to communications when a conference occurs in which the first and second conference servers communicate audio and video data to one another.

10. A computer program product for managing communications during a videoconference, the program product including computer executable instructions stored on a non-transitory computer readable storage medium that when executed by one or more computers cause the one or more computers to perform the steps of:
   receive an input first set of communications control parameters that apply to all videoconferences to be conducted over one or more videoconference servers;
   store the input first set of control parameters in a memory;
   receive an input second set of communications control parameters that includes a subset of the first set and that apply only to a first portion of videoconferences to be conducted over the one or more videoconference servers;

compare the second set of communications control parameters to the first set of control parameters; and, retain the second set of communications control parameters in a memory for application during the only a portion of videoconferences if they do not violate the first set of control parameters.

11. A computer program product for managing communications during a videoconference as defined by claim 10 wherein the program further causes the one or more computers to:

receive an input third set of communications control parameters that includes a subset of the first set and that apply only to a second portion of videoconference to be conducted over the one or more videoconference servers;

compare the third set of communications control parameters to the first set of control parameters and to the second set of control parameters;

retain the third set of communications control parameters in a memory for application to the second portion of videoconferences if they do not violate the first or second sets of control parameters.

12. A computer program product for managing communications during a videoconference as defined by claim 11 wherein there are a plurality of users registered with the conference server for participating in videoconferences over the conference server, wherein the second set of parameters specifies only a portion of the plurality of users that is less than all of the plurality of users and wherein the second set of parameters applies only to the portion of the plurality of users, and wherein the third set of parameters applies only to one specified videoconference held over the conference server.

13. A computer program product for managing communications during a videoconference as defined by claim 10 wherein the program further causes the one or more computers to:

request a revised member of the second set of control parameters be input if that member of the second set of control parameters violates a corresponding member of the first set, and to retain the revised member of the second set in the memory for use during the first portion of the videoconference if it does not violate the corresponding member of the first set.

14. A computer program product for managing communications during a videoconference as defined by claim 10 wherein the program further causes the one or more computers to apply the first and second set of communications control parameters to videoconferences conducted over the one or more conference servers, and to perform one or more of the steps of:

terminating one or more processes when corresponding of the first or second sets of control parameters are violated during the videoconferences; and, refusing to initiate a newly requested process if that process would cause a parameter to be violated.

15. A computer program product for managing communications during a videoconference as defined by claim 10 wherein the program further causes the one or more computers to terminate the one or more processes according to a priority when the parameter is violated, the priority including terminating the most recently initiated process over terminating an earlier initiated process.

16. A computer program product for managing communications during a videoconference as defined by claim 10 wherein:

the communications control parameters of either the first or second parameter sets include at least a maximum bandwidth that can be communicated during a conference, a maximum number of data streams that can be communicated during a conference, a maximum number of video data streams that can be communicated by any user during a videoconference, and a maximum number of attendees for a videoconference; and;

wherein the second set of control parameters are set by a videoconference moderator and apply only to one videoconference to be held over the conference server, and wherein the program further causes the one or more computers to apply the second set of parameters to all attendees of the one videoconference except for the moderator.

17. A computer program product for managing communications during a videoconference as defined by claim 10 wherein the conferencing parameters include a maximum bandwidth limit for each of the users, a maximum number of data streams allowed to be communicated from each of the users during a video conference, a maximum number of data streams to be communicated to each of the users during a video conference, and a video resolution limit.

18. A computer program product for managing communications during a videoconference as defined by claim 10 wherein the program instructions further cause the one or more computers to apply one or more rules to determine which of the communications control parameters to apply when a parameter conflict occurs during a videoconference with one or more users connected to a second conference server that has different control parameters.

19. A computer program product for managing communications during a videoconference as defined by claim 10 wherein the program instructions further cause the one or more computers to record usage of one or more applications that correspond to one or more of the parameters during videoconferences and to provide a report summarizing the usage whereby the report provides guidance on setting the one or more parameters.

20. A computer program product for managing communications during a videoconference, the program product including computer executable instructions stored on a non-transitory computer readable storage medium that when executed by one or more computers cause the one or more computers to perform the steps of:

receive an input first set of communications control parameters that apply to all videoconferences to be conducted over one or more videoconference servers, the control parameters including at least a maximum number of video data streams to be communicated during any videoconference and a maximum number of video data streams to be communicated by any user during a videoconference;

store the input first set of control parameters in a memory;

receive an input second set of communications control parameters that is a subset of the first set, the second set of control parameters applying to only a portion of videoconferences to be conducted over the one or more videoconference servers;

compare each parameter from the second parameter set to corresponding parameters from the first set of control parameters;

retain the parameters from the second parameter set in a memory only if they do not violate corresponding parameters from the first set of control parameters;

receive an input third set of communications control parameters that is a subset of the first set and the second set, the third set of parameters only applying to different portion of videoconference to be conducted over the one or more videoconference servers;

compare each parameter from the third parameter set to corresponding parameters from the first set of control parameters and to corresponding parameters from the second set of control parameters;

retain parameters from the third parameter set in a memory for application during the different portion of videoconferences only if they do not violate the corresponding parameters from the first or second parameter sets;

apply the first, second and third set of communications control parameters to one or more videoconferences conducted over the one or more conference servers and to ensure that the first or second sets of control parameters are not violated during the videoconferences; and, wherein one of the second or third sets of control parameters applies only to one specified videoconference and to all of the attendees of that videoconference except for a conference moderator.

\* \* \* \* \*